US012616350B2

(12) United States Patent
Schnitzer et al.

(10) Patent No.: US 12,616,350 B2
(45) Date of Patent: May 5, 2026

(54) METHOD AND APPLIANCE FOR MOPPING UP AN ACCUMULATION OF LIQUID

(71) Applicant: BSH Hausgeräte GmbH, Munich (DE)

(72) Inventors: Frank Schnitzer, Bad Neustadt (DE); Manuel Weidl, Salz (DE)

(73) Assignee: Hausgeräte GmbH, Munich (DE)

( * ) Notice: Subject to any disclaimer, the term of this patent is extended or adjusted under 35 U.S.C. 154(b) by 19 days.

(21) Appl. No.: 18/660,464

(22) Filed: May 10, 2024

(65) Prior Publication Data

US 2024/0374105 A1     Nov. 14, 2024

(30) Foreign Application Priority Data

May 10, 2023    (DE) .......................... 102023204345.9

(51) Int. Cl.
*A47L 11/40*          (2006.01)
*A47L 9/28*           (2006.01)
          (Continued)

(52) U.S. Cl.
CPC ......... *A47L 11/4011* (2013.01); *A47L 9/2826* (2013.01); *A47L 9/2852* (2013.01); *A47L 11/24* (2013.01); *A47L 11/29* (2013.01); *A47L 11/4016* (2013.01); *A47L 11/4083* (2013.01); *G05D 1/6486* (2024.01); *A47L 2201/04* (2013.01);
          (Continued)

(58) Field of Classification Search
CPC ........ A47L 11/24; A47L 11/29; A47L 11/302; A47L 11/4011; A47L 11/4016; A47L 11/4041; A47L 11/4044; A47L 11/4083; A47L 11/4088; A47L 2201/04; A47L 2201/06; A47L 9/2826; A47L 9/2852;
          (Continued)

(56) References Cited

U.S. PATENT DOCUMENTS 9,265,396 B1 *   2/2016   Lu ........................... A47L 13/24
9,427,127 B2     8/2016   Dooley et al.
          (Continued)

FOREIGN PATENT DOCUMENTS

DE    102018200691 A1 *   7/2019   ......... G01B 9/02092
KR       102278899 B1     7/2021
WO      2022170722 A1     8/2022

OTHER PUBLICATIONS

DE102018200691A1 machine translation (Year: 2019).*

*Primary Examiner* — Douglas Lee
(74) *Attorney, Agent, or Firm* — Laurence A. Greenberg; Werner H. Stemer; Ralph E. Locher

(57) ABSTRACT

A method for controlling a mobile, self-propelled appliance, in particular a floor cleaning appliance such as a robot vacuum cleaner and/or a sweeper and mopping robot so as to mop up an accumulation of liquid, includes driving on a floor surface intended for cleaning in a direction of travel in a forward movement of the appliance and cleaning the floor surface by using a dry cleaning module and/or a wet cleaning module of the appliance. The accumulation of liquid is detected in the direction of travel in front of the appliance in a moist area. The forward movement in front of the moist area is terminated and the appliance is rotated about substantially 180°. Driving on the moist area in a reversing movement in the direction of travel of the appliance and mopping up the accumulation of liquid using the wet cleaning module is carried out.

9 Claims, 4 Drawing Sheets

(51) Int. Cl.

| | |
|---|---|
| *A47L 11/24* | (2006.01) |
| *A47L 11/29* | (2006.01) |
| *G05D 1/648* | (2024.01) |
| *G05D 105/10* | (2024.01) |

(52) U.S. Cl.
CPC ...... *A47L 2201/06* (2013.01); *G05D 2105/10* (2024.01)

(58) Field of Classification Search
CPC .... G05D 1/6486; G05D 2105/10; G05D 1/00; G05D 2107/40; G05D 2109/10
See application file for complete search history.

(56) References Cited

U.S. PATENT DOCUMENTS

| | | | |
|---|---|---|---|
| 10,952,586 B2 | 3/2021 | Jang et al. | |
| 2015/0128364 A1 | 5/2015 | Dooley | |
| 2019/0343354 A1* | 11/2019 | Hong .................... A47L 9/2857 |
| 2022/0000328 A1 | 1/2022 | Lee et al. | |
| 2024/0122434 A1 | 4/2024 | Li et al. | |

* cited by examiner

Fig. 1A
Fig. 1B
Processing Facility
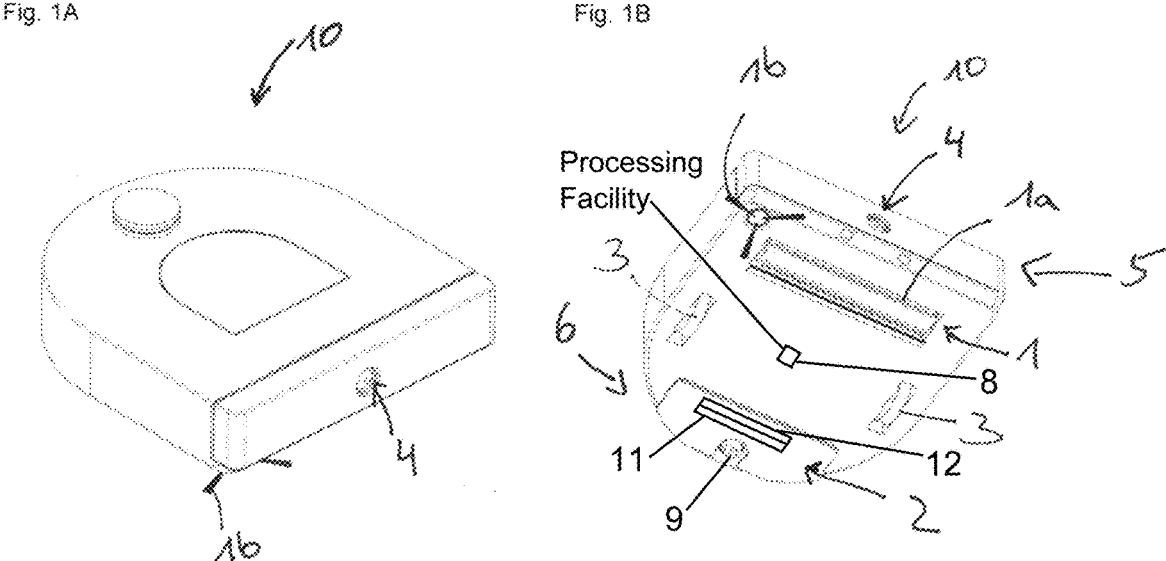
Fig. 2A
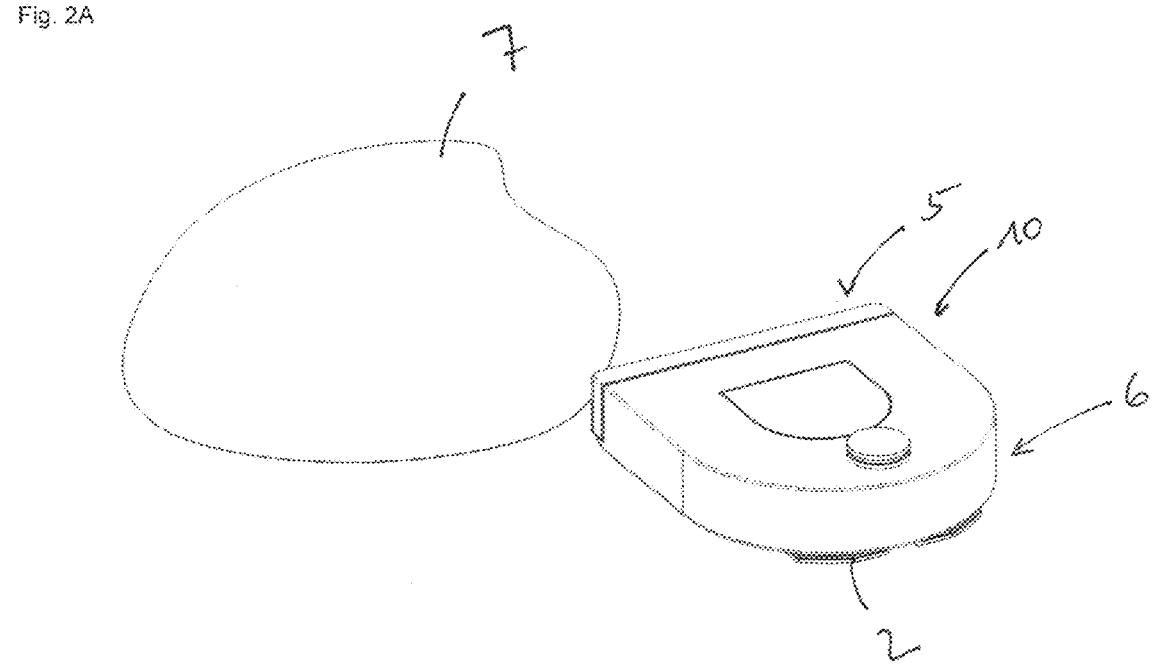

Fig. 3A
Fig. 3C
Fig. 3B
Fig. 3D
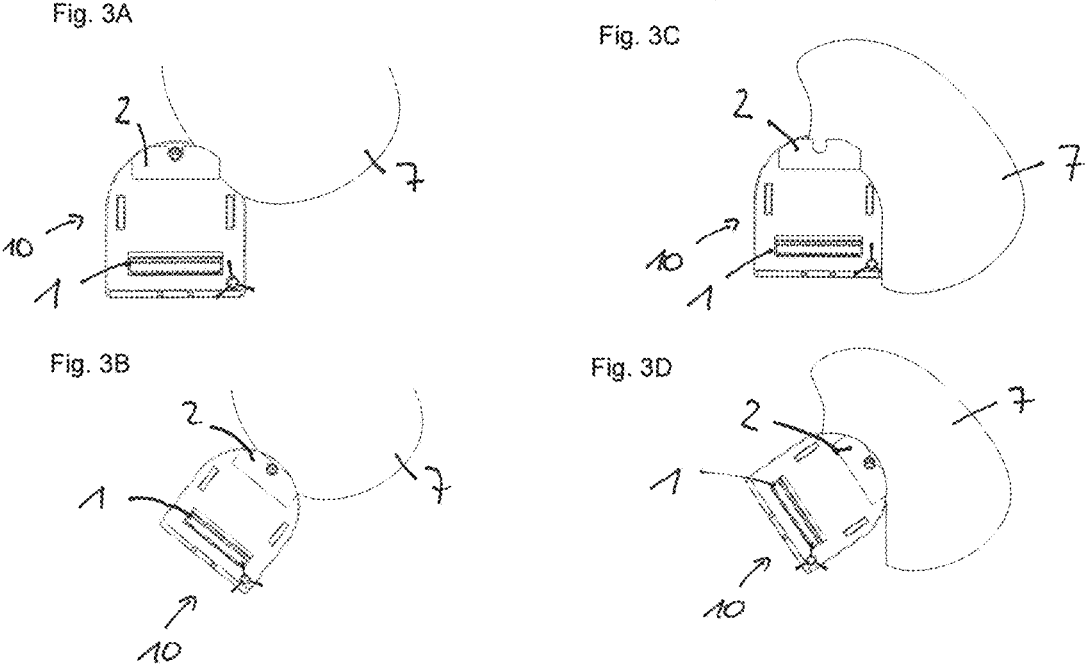
Fig. 4A
Fig. 4B
Fig. 4C
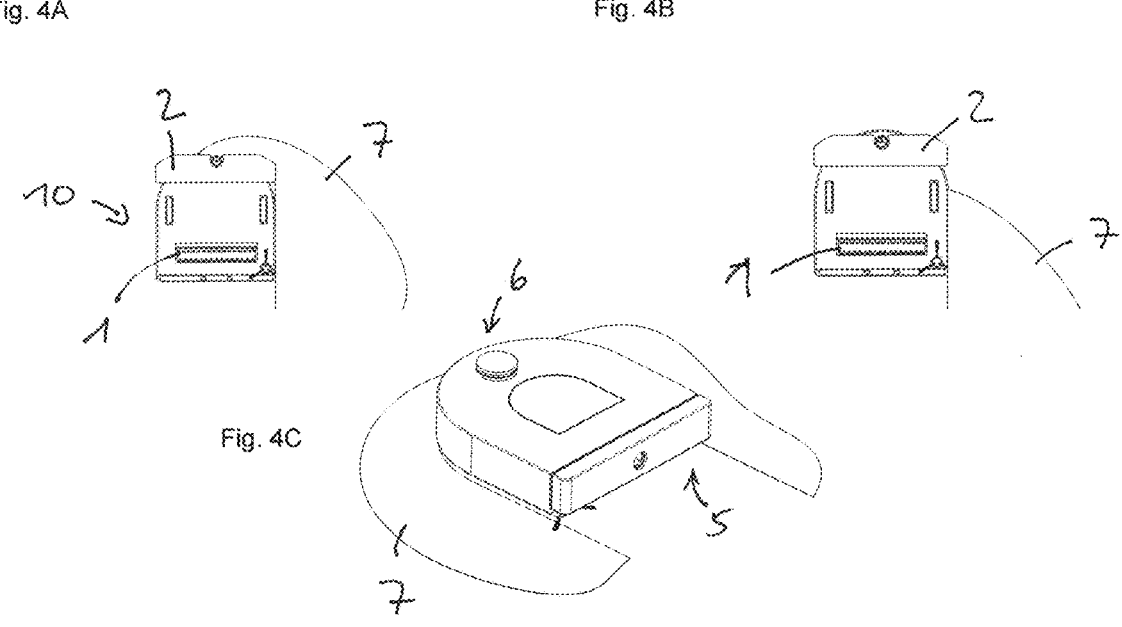

101 — Perform Forward Cleaning with Robot

102 — Initiate Mopping Method

103 — Rotate 180° In Front of Liquid

104 — Approach Liquid in Reverse Until Contacting Liquid

105 — Upon Contacting Liquid, Rotate to One or Both Sides and Then to Starting Position 106 — Travel Slightly in Reverse Into Liquid 107 — Reach the End of the Liquid 108 — Rotate 180° in Forward Direction and Continue Cleaning

METHOD AND APPLIANCE FOR MOPPING UP AN ACCUMULATION OF LIQUID

CROSS-REFERENCE TO RELATED APPLICATION

This application claims the priority, under 35 U.S.C. § 119, of German Patent Application DE 10 2023 204 345.9, filed May 10, 2023; the prior application is herewith incorporated by reference in its entirety.

FIELD AND BACKGROUND OF THE INVENTION

The invention relates to a method for controlling a mobile, self-propelled appliance, in particular a floor cleaning appliance, such as a robot vacuum cleaner and/or sweeper and mopping robot so as to mop up an accumulation of liquid and also to a mobile self-propelled appliance which is controlled according to such a method.

Mobile self-propelled appliances such as for example robot vacuum cleaners have the task of cleaning an entire floor surface as autonomously as possible. In particular, robot vacuum cleaners are meant to relieve their users of the task of regularly removing dust and dirt from the floor. In addition to pure vacuuming, there is an increasing demand from users for wet cleaning after dry cleaning. For that purpose, cleaning robots are used that are additionally equipped with a mopping function in addition to the suction function, so that they can both vacuum and mop the floor. In most cases, those combined vacuum and mop appliances have a dry cleaning module in the front area with a suction mouth for sweeping and vacuuming and a wet cleaning module in the rear area. A rubber or sealing lip is often disposed at the suction mouth and the rubber or sealing lip reaches down to the floor, can push dust in front of it and supports the sweeping effect.

However, there is a risk that the sealing lip will push liquids that are on the floor, such as water pools, puddles or knocked over drinks, in front of the sealing lip or distribute them on the floor as a thin film. The wet cleaning module can indeed mop up the distributed liquid. However, there is a risk that disadvantageously visible trails of the liquid remain on the floor, for example in the event that the wet cleaning module is not wider on both sides than the dry cleaning module, that the robot does not travel a straight path, for example during cornering, or that the robot cannot reach every point with the wet cleaning module due to the conditions of its environment, for example at room corners, in close surroundings of obstacles or at the base station during docking. There is also the risk that drive units of the robot will roll over wet areas and contaminate the floor with trails with moist wheels.

There is also the risk that the robot partially sucks in the liquid so that it gets into a dust container, mixes with dust there and possibly gets stuck in the filter or damages internal components.

In order to avoid that problem, some robots have the wet cleaning module in the front area in the direction of travel. However, in that case the floor is mopped before it is freed from dust. As a result, impurities accumulate disadvantageously quickly on the mopping cloth, so that the cleaning effect of the mopping cloth quickly decreases and the mopping cloth therefore has to be replaced or cleaned by the user in short time intervals.

SUMMARY OF THE INVENTION

It is accordingly an object of the invention to provide a method for mopping up an accumulation of liquid using a mobile, self-propelled appliance, which avoids the above-mentioned disadvantages and in particular reduces the risks of undesired distribution of liquids and in which an effective mopping up of liquids is simultaneously provided.

With the foregoing and other objects in view there is provided, in accordance with the invention, a method for controlling a mobile, self-propelled appliance, in particular a floor cleaning appliance such as a robot vacuum cleaner and/or sweeper and mopping robot so as to mop up an accumulation of liquid, comprising the following method steps:

driving on a floor surface intended for cleaning in the direction of travel in forward movement of the appliance and cleaning the floor surface using a dry cleaning module and/or a wet cleaning module of the appliance, detecting the accumulation of liquid in the direction of travel in front of the appliance in a moist area, terminating the forward movement in front of the moist area and rotating the appliance about substantially 180°, and driving on the moist area in reversing movement in the direction of travel of the appliance and mopping up the accumulation of liquid using the wet cleaning module.

Advantageous embodiments and developments are the subject matter of the dependent claims.

In the present case, in particular, soiling and/or clogging of the dry cleaning module by an accumulation of liquid that is distributed on the floor is avoided by the appliance cleaning while traveling in reverse in areas with liquids and thus absorbing the liquids with the wet cleaning module before they can reach the dry cleaning module. A dry route is therefore generated with the wet cleaning module before the dry cleaning module passes this dried route. In areas that are dry, in which there is consequently no accumulation of liquid, the appliance cleans traveling in a forward direction, in other words in particular first using the dry cleaning module and subsequently cleaning using the wet cleaning module.

Preferably, the dry cleaning module is disposed in a front area in the direction of travel in forward movement of the appliance and the wet cleaning area is disposed in a rear area of the appliance. If the appliance detects liquid in front of it on its route, the appliance stops its forward movement before it touches the liquid. The appliance rotates on the spot about approximately 180° and continues its journey in reverse, so that first the wet cleaning module and not the dry cleaning module comes into contact with the liquid.

By reversing the direction of travel of the appliance in front of the accumulation of liquid, this liquid can be safely removed from the floor without being distributed by the appliance in the room. In this case, components of the appliance that are in contact with dust, such as a suction mouth, a sealing lip, a brush roller, side brushes, drive wheels and/or a dust container having a filter, do not come into contact with the liquid and remain dry. The dust and liquid that is absorbed using the appliance consequently does not stick together or advantageously sticks together to a clearly reduced extent. In the present case, the driving behavior or cleaning behavior of the appliance is advantageously adapted to the situation.

A mobile self-propelled appliance is to be understood in particular as a floor cleaning appliance which, for example, can autonomously process floor surfaces in the household area. These include, inter alia, robot vacuum cleaners and/or sweeper and mopping robots. In particular, the mobile, self-propelled appliance is a combination appliance that can clean both dry and wet. The appliances work in operation (cleaning operation) preferably without or with as little user intervention as possible. For example, the appliance automatically travels into a predetermined room in order to clean the floor in accordance with a predetermined and programmed method strategy.

In order to be able to take into account any individual environmental characteristics, an exploration journey with the mobile self-propelled appliance preferably takes place. An exploration journey is to be understood in particular as an investigatory journey which is suitable for investigating a floor surface to be processed for obstacles, floor plan and the like. The aim of an exploration journey is, in particular, to be able to assess and/or represent the conditions of the floor processing area that is to be processed.

After the exploration journey, the mobile self-propelled appliance knows its environment and can pass it on to the user in the form of an environment map, for example in an app (cleaning app) on a mobile device. In the environment map, the user can be given the opportunity to interact with the mobile self-propelled appliance. The user can advantageously view information in the environment map and change and/or adapt the information if necessary.

An environment map is to be understood in particular as any map which is suitable for representing the environment of the floor processing area with all its obstacles and items. For example, the environment map shows in a sketch-like manner the floor processing area having the furniture and walls contained therein.

The environment map with the obstacles is preferably displayed in the app on a portable additional device. This is used in particular to visualize a possible interaction for the user. In the present case, an additional device is to be understood in particular as any device which is portable for a user, which is disposed outside the mobile self-propelled appliance, in particular externally and/or differentiated from the mobile self-propelled appliance, and is suitable for displaying, providing, communicating and/or transmitting data, such as, for example, a cell phone, a smartphone, a tablet and/or a computer or laptop.

The app, in particular the cleaning app, is installed on the portable additional device, which is used for the communication of the mobile, self-propelled appliance with the additional device and in particular renders possible a visualization of the floor processing area, in other words the living space to be cleaned or the home or living quarters, in particular indoor area. The app preferably shows the user the area to be cleaned as an environment map.

An accumulation of liquid is to be understood in particular as any accumulation that is located on the floor which has at least components of a moist substance. These include, in particular, liquid pools, puddles, spilled beverages, moist or wet footprints, urine emitted by pets and/or overflowing washbasins, showers or bathtubs.

The direction of travel in forward movement is to be understood in particular as the travel movement of the appliance which is provided in dry areas of the floor during cleaning or travel operation. The appliance therefore travels with its front area in front along the intended travel path. The rear area in this case follows the front area in the movement. In particular, the front area first passes over the floor to be cleaned before the rear area passes the floor to be cleaned.

A reversing movement in the direction of travel is to be understood in particular as any journey having a direction of travel which remains the same, wherein the appliance travels backward, in other words in reverse. The travel path and in particular the direction of the intended travel path therefore does not change. The appliance continues to travel its path.

However, the appliance turns around when traveling the path, so that it no longer travels forward but rather in reverse along this path. The appliance performs the reversing movement with its rear area in front, wherein the front area follows the rear area in the movement. The rear area therefore first passes over the floor to be cleaned before the front area passes the floor to be cleaned.

A dry cleaning module is to be understood in particular as a module of the appliance which is suitable for dry cleaning, in other words is intended in particular for vacuuming and/or sweeping. For example, the dry cleaning module has a suction mouth having a brush roller and sealing lip as well as a side brush at a front housing corner.

A wet cleaning module is to be understood in particular as a module of the appliance which is suitable for wet cleaning, in other words is intended in particular for mopping. For example, the wet cleaning module has a mopping unit, for example a mopping cloth/pad, and optionally a container unit, for example a fresh water tank with cleaning liquid, wherein the mopping unit can be moistened externally for mopping with the cleaning liquid or in the event of a container unit not being available. It is also possible to use several cloths/pads. These can be driven so that they move relative to the appliance. In addition to planar mopping cloths/pads, cylindrical mopping rollers rotating about a horizontal axis can also be used. In order that the mopping unit does not come into excessive contact with dirt on the floor during operation, a width of the wet cleaning module is preferably equal to or less than a width of the dry cleaning module.

The accumulation of liquid can be detected by the appliance. A detecting facility is preferably provided for this purpose on the appliance and is configured so as to detect an accumulation of liquid in a moist area and is disposed in a front area of the appliance. The moist area is in particular the floor area that includes the accumulation of liquid. The front area of the appliance is in particular a front side of the appliance, in other words the side of the appliance which is directed forward in the direction of travel and forward movement in normal operation. The detecting facility is, for example, a sensor that can evaluate information from the environment and is able to detect liquids on the floor before the appliance comes into contact with them. For example, the sensor is a forward-facing camera that can identify glossy surfaces by image evaluation and object recognition, for example. Alternatively, the detecting facility is a moisture sensor in the front area of the underside of the appliance, which can identify a locally increasing humidity.

A rotation of the appliance about substantially 180° is to be understood in particular as an inversion of the appliance on the spot, in particular an inversion from a front area to the rear and from a rear area to the front (in the direction of travel), in other words a half rotation about its own appliance axis. The appliance therefore performs a 180° turn and then stands facing backward. Of course, it is not absolutely necessary for the appliance to rotate about exactly 180°. Deviations from this are included as long as the appliance can move in reverse in the direction of travel on the intended path after its rotation. Deviations from the intended path for dry cleaning are also possible, for example in order to initially process an accumulation of liquid completely.

In one advantageous embodiment, a cleaning liquid supply of the wet cleaning module is in an active mode in forward movement in the direction of travel of the appliance and is in an inactive mode in reversing movement in the direction of travel of the appliance. For example, in the active mode, the mopping unit is moistened with cleaning liquid from the container unit, while in the inactive mode, moistening from the appliance's own container is stopped during the reversing movement of the appliance. Due to absorbing the accumulation of liquid from the floor, the mopping unit is already moist enough so that it is not necessary for the appliance to supply additional cleaning liquid. Depending on the size of the accumulation of liquid, the reactivation of the supply of cleaning liquid to the mopping unit can be resumed after a predetermined time.

In a further advantageous embodiment, the appliance performs the reversing movement in the direction of travel with rotational movements to one side of up to 90°, for example about 30° to 90°, with respect to the reversing movement if the moist area is located to one side of the reversing movement. If, in particular, a width of the wet cleaning module does not cover all contact points of the appliance with the floor, for example the drive wheels, support rollers and/or the dry cleaning module, driving straight in reverse is not optimal for absorbing an accumulation of liquid. Instead, the appliance travels a short distance, which preferably corresponds to half to a maximum of the full length of the mopping unit, before the appliance rotates on the spot in order to allow the mopping unit to mop to the side of the actual travel path. The appliance then rotates back again and can travel a further distance in the direction of the accumulation of liquid when the reverse direction of travel is reached.

If the appliance moves on a path adjacent to the accumulation of liquid and therefore reaches an accumulation of liquid approximately tangentially, the appliance only rotates in one direction to the side while traveling in reverse, in particular to the side of the accumulation of liquid. If, on the other hand, the accumulation of liquid is not located to the side of the appliance, but rather approximately centrally, in other words in particular if the accumulation of liquid is in the vicinity of a room wall while the appliance is travelling along the room wall, or if the appliance is on a transit journey, the appliance performs the rotation about 30° to 90° on the spot for mopping in both directions before the appliance travels a distance in reverse again. It is preferred that the appliance performs the reversing movement in the direction of travel with rotational movements to both sides of 30° to 90° with respect to the reversing movement if the moist area is located on both sides of the reversing movement.

In a further advantageous embodiment, the reversing movement includes the following steps:

straight reversing movement of a first short distance toward the moist area, wherein the first short distance preferably corresponds to half to a maximum of the full length of the wet cleaning module, on the spot, rotating the appliance about 30° to 90° to one side or to both sides, rotating the appliance back to its original starting position prior to rotation, and continuing to travel in a straight reversing movement of a second short distance into the moist area, wherein the second short distance preferably corresponds to half to a maximum of the full length of the wet cleaning module.

The method steps of rotating, rotating back and continuing to travel are preferably repeated until the moist area has been travelled through. In this manner, it can be prevented that liquid of the accumulation of liquid passes by the mopping unit and comes into contact with drive wheels or the suction mouth.

If the wet cleaning module on the appliance has a width that covers all contact points of the appliance with the floor, i.e. the mopping unit is configured to be wide, lateral rotation while traveling in reverse can be omitted and the appliance performs a continuous, straight reversing movement.

In a further advantageous embodiment, a length of the moist area in the direction of travel is determined upon detecting the accumulation of liquid prior to rotating the appliance. The extent to which the appliance must travel in reverse in order to travel through all of the moist area is determined in advance directly upon detecting the accumulation of liquid, for example by a camera and image processing.

In an alternative embodiment, a presence of the accumulation of liquid after driving on the moist area is checked in predetermined distances by rotating the appliance back in the direction of travel in forward movement and determining whether the accumulation of liquid continues to be present. The appliance therefore rotates forward again after a defined distance, for example 0.5 m, and checks again whether an accumulation of liquid is still identified.

Further alternatively, the appliance can have a corresponding sensor system on its rear side, which is suitable for identifying liquids in order to determine the end of the accumulation of liquid.

If the accumulation of liquid can no longer be detected, i.e. the moist area is at an end, the appliance can continue its journey traveling forward.

With the objects of the invention in view, there is also provided a mobile self-propelled appliance, in particular a floor cleaning appliance such as a robot vacuum cleaner and/or sweeper and mopping robot for mopping up an accumulation of liquid, wherein the appliance comprises the following:

a drive facility for driving on a floor area to be cleaned, a dry cleaning module for dry cleaning the floor surface, which is disposed in a front area of the appliance in forward movement in the direction of travel, a wet cleaning module for wet cleaning the floor surface, which is disposed in the direction of travel in forward movement in a rear area of the appliance, a detecting facility that is configured so as to detect an accumulation of liquid in a moist area and that is disposed in a front area of the appliance, and a processing facility that is configured so as to rotate the appliance about substantially 180° in front of the accumulation of liquid upon detecting the accumulation of liquid and so as to drive on the moist area in reversing movement in the direction of travel.

Any features, configurations, embodiments and advantages relating to the method are also used in connection with the appliance in accordance with the invention, and vice versa.

In one advantageous embodiment, the appliance includes a further detecting facility that is configured so as to detect the accumulation of liquid in the moist area and that is disposed in a rear area of the appliance. As a result, an end of the moist area can advantageously be determined, so that the appliance can resume its forward travel after traveling through the moist area.

In a further advantageous embodiment, the wet cleaning module includes at least one mopping unit and a container unit, wherein in an active mode the mopping unit is moistened with liquid from the container unit, and in an inactive mode a supply of liquid from the container unit to the mopping unit is suspended.

Other features which are considered as characteristic for the invention are set forth in the appended claims.

Although the invention is illustrated and described herein as embodied in a method and an appliance for mopping up an accumulation of liquid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIGS. 1A, 1B are diagrammatic, perspective views of an exemplary embodiment of a mobile, self-propelled appliance which can be controlled by a method in accordance with the invention;

FIGS. 2A-2C are diagrammatic, perspective views of an exemplary embodiment of a control method in accordance with the invention having steps of 180° rotation;

FIGS. 3A-3D are diagrammatic, plan views of an exemplary embodiment of a control method in accordance with the invention having rotational mopping movements to one side;

FIGS. 4A-4C are diagrammatic, plan and perspective views of an exemplary embodiment of a control method in accordance with the invention without rotational mopping movements;

DETAILED DESCRIPTION OF THE INVENTION

Figure 2B:
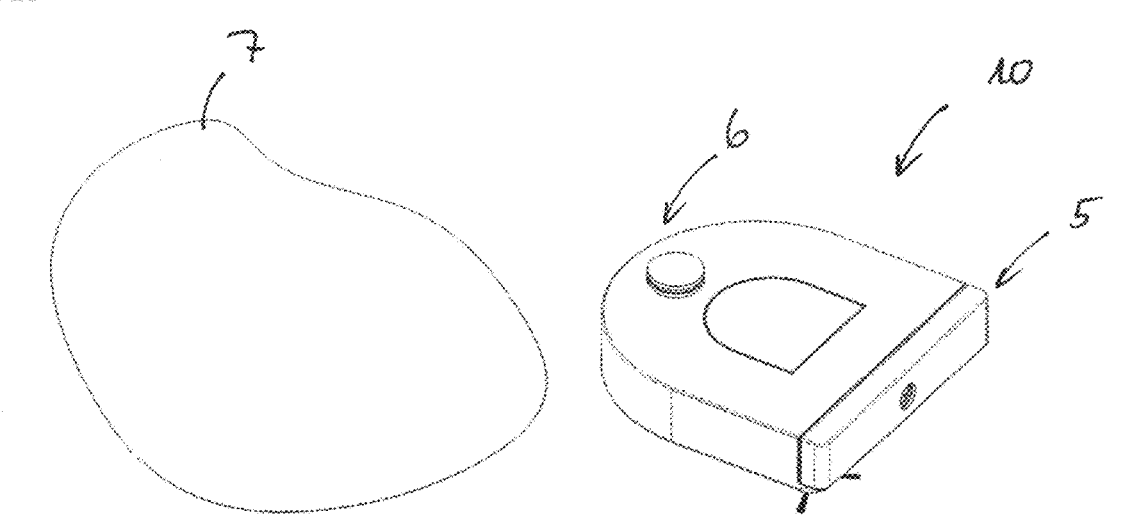

Referring now to the figures of the drawings in detail and first, particularly, to FIG. 1A thereof, there is seen a perspective view of a mobile, self-propelled appliance 10, in particular a vacuum mop combination appliance or a vacuum mop robot, which is intended for autonomous floor cleaning. FIG. 1B shows a bottom view of the vacuum cleaning robot of FIG. 1A. In a front area 5, the robot has a dry cleaning module 1 that extends over a certain width. The dry cleaning module 1 includes a suction mouth 1a having a brush roller as well as a side brush 1b at a front housing corner. In a rear area 6 of the robot, there is a wet cleaning module 2 which includes at least one mopping cloth or mopping pad which can be moistened with cleaning liquid from a container unit 12 of the robot or externally. In order that the mopping unit 11 does not come into excessive contact with dirt on the floor, a width of the wet cleaning module is preferably equal to or less than a width of the dry cleaning module 1.

In a central area, the robot has a drive facility, in particular drive wheels 3, for driving on a floor area to be cleaned. At least one sensor 4 is disposed on a front area. The sensor can evaluate information from the environment and is particularly suitable for detecting accumulations of liquid on the floor before the robot comes into contact with them, i.e. in particular before it travels through them. The sensor 4 is, for example, a forward-facing camera that identifies glossy surfaces in particular by image evaluation and object recognition, or a moisture sensor in the front area of the underside of the robot that detects a locally increasing humidity.

Furthermore, the robot has a processing facility 8 that is configured so as to rotate the appliance about substantially 180° in front of the accumulation of liquid upon detecting the accumulation of liquid and so as to drive on the moist area in reversing movement in the direction of travel. If the robot therefore detects an accumulation of liquid, for example a liquid pool, using its sensor 4, the robot stops its forward movement before it touches the liquid.

Figure 2C:
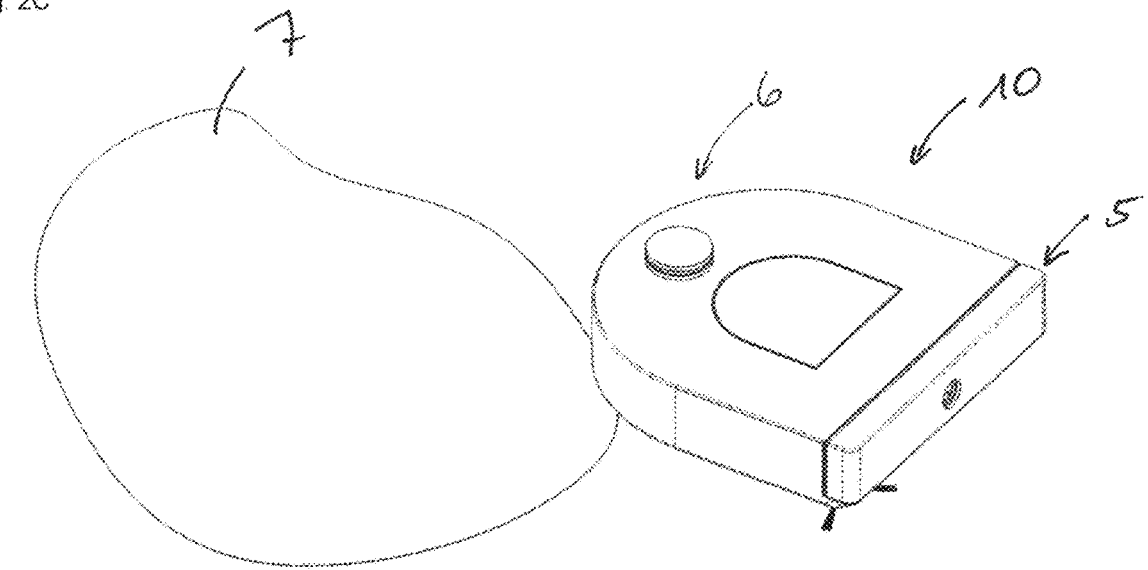

The driving behavior of the robot after a detected accumulation of liquid 7, is illustrated in FIGS. 2A to 2C.

In order to clean the floor, the robot travels its intended paths in forward movement. If, using the sensor 4, the robot detects an accumulation of liquid 7 of any type, the robot stops its forward movement in front of the liquid without passing through it, as shown in FIG. 2A. The robot then rotates on the spot by approximately 180°, so that its rear area 6 is now oriented forward in the direction of travel and its front area 5 is now oriented rearward in the direction of travel, as shown in FIG. 2B. The robot now approaches the accumulation of liquid 7 in reverse until the wet cleaning module has contact with the liquid (see FIG. 2C), so that the mopping cloth can absorb the liquid from the accumulation of liquid 7 before the robot travels over the liquid with its dry cleaning module.

If the width of the wet cleaning module 2 does not cover all contact points of the robot with the floor, in particular the drive wheels 3 and the dry cleaning module 1, a simple, straight reversing movement continuous through the moisture is not suitable for mopping without exposing itself to the risk of smearing or distributing the liquid. In this case, the driving behavior of the robot, which is shown in FIGS. 3A to 3D, is advantageous. As shown in FIG. 3A, the appliance 10 travels a first short distance toward the moist area or with its front area into the accumulation of liquid 7 in a straight reversing movement until the distance travelled corresponds to approximately half to a maximum of the full length of the wet cleaning module 2. The robot then stops and rotates on the spot in the direction of the moist area in order to have the wet cleaning module 2 mop to the side of the actual path of the robot (see FIG. 3B). In this case, the robot is rotated on the spot about approximately 30° to 90° relative to the actual travel direction axis of the reversing movement of the robot, in other words to the reversing movement direction. The robot then immediately rotates on the spot back to the starting position of the reversing movement, i.e. back to the actual travel direction axis of the reversing movement of the robot. When the reverse direction of travel is reached, the robot travels a second short distance in a straight reversing movement into the moist area, as shown in FIG. 3C. The second short distance again corresponds to about half to a maximum of the full length of the wet cleaning module 2. Here, the robot stops and performs the rotation about 30° to 90° including rotating back a second time, as shown in FIG. 3D, in order to further mop up the accumulation of liquid 7 in the moist area. The steps of continuing to travel bit by bit into the moist area and then rotating about 30° to 90°, including turning back, are repeated until the moist area has been completely travelled through. The robot then rotates again by 180° in the forward direction in order to clean the floor traveling in a forward direction in the usual manner in accordance with its cleaning task, wherein in this case the dry cleaning module 1 travels ahead of the wet cleaning module 2.

If the robot moves on adjacent paths and reaches a moist area substantially tangentially, the method of FIGS. 3A to 3D is implemented, in which the appliance rotates in one direction to the side, i.e. in the direction of the moist area. If the wet cleaning module 2 on the robot has a width that covers all contact points of the robot with the floor, i.e. the wet cleaning module 2 is configured to be comparatively wide, lateral rotation during passage through the moist area while traveling in reverse, as shown in FIGS. 4A to 4C, is omitted. In this case, the robot performs a continuous, straight reversing movement. After the moist area, the robot rotates again about 180° in the forward direction in order to further process the floor as intended, with the dry cleaning module 1 being placed ahead of the wet cleaning module 2.

Figures 5A, 5B, 5C:
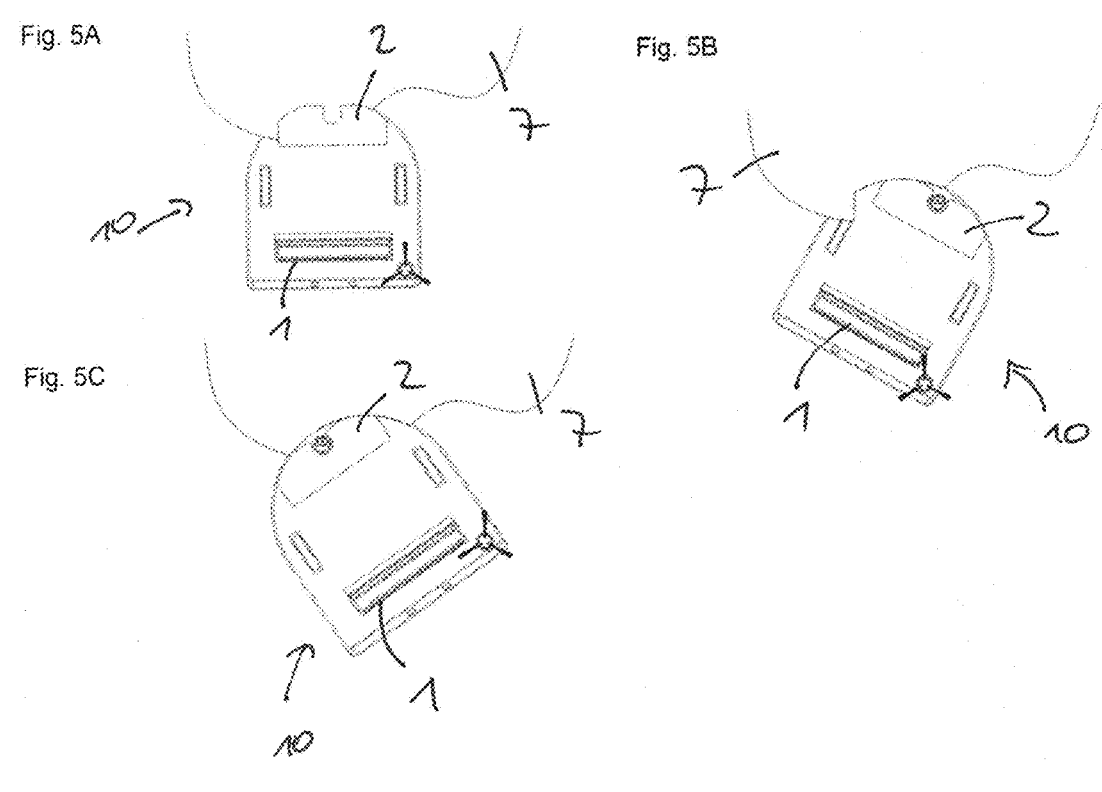
FIGS. 5A-5C are diagrammatic, plan views of an exemplary embodiment of a control method in accordance with the invention having rotational mopping movements to both sides.

If the moist area is not located to the side of the robot, but rather is located almost centrally, for example if the accumulation of liquid is in the vicinity of a room wall, or if the robot is on a transit journey, and the width of the wet cleaning module 2 is less than the contact points of the robot with the floor, the robot performs the partial rotation about 30° to 90° for mopping in both directions with respect to the direction of travel axis of the reversing movement before the robot travels back again bit by bit. This driving behavior is illustrated in FIGS. 5A to 5C. First, the robot travels a first short distance into the moist area (FIG. 5A). The robot then rotates on the spot about 30° to 90° in a direction relative to the direction of travel axis of the reversing movement (FIG. 5B), in order to subsequently immediately rotate back into the starting position. At the same point, a rotation about 30° to 90° in the other direction relative to the direction of travel axis of the reversing movement (FIG. 5C) is now performed in order to immediately likewise rotate back into the starting position. The appliance subsequently continues driving in the direction of travel axis in a straight reversing movement along a second short distance into the moist area. This driving behavior with bilateral rotation is also carried out if the robot cannot determine a lateral extension of the moist area.

The extent to which the robot must travel rearward is determined in advance by the detecting facility upon detecting the accumulation of liquid. Alternatively, the robot rotates forward in the forward direction after a predefined distance of, for example, 0.5 m in order to check whether an accumulation of liquid is still detected. Further alternatively, the robot has a further detecting facility 9 on its rear side opposite the front side in order to determine the end of the moist area. If the moist area can no longer be identified, the robot can continue its journey as usual in the forward direction and continue its cleaning task.

During the reversing movement, the robot stops moistening the mopping cloth of the wet cleaning module 2 from its own container in order to avoid too high a moisture content in the mopping cloth and thus less liquid absorption from the floor. Subsequently, i.e. after driving through the moist area and after rotating the robot in the forward direction, the reactivation of the pump for moistening the mopping cloth is resumed.

Figure 6:
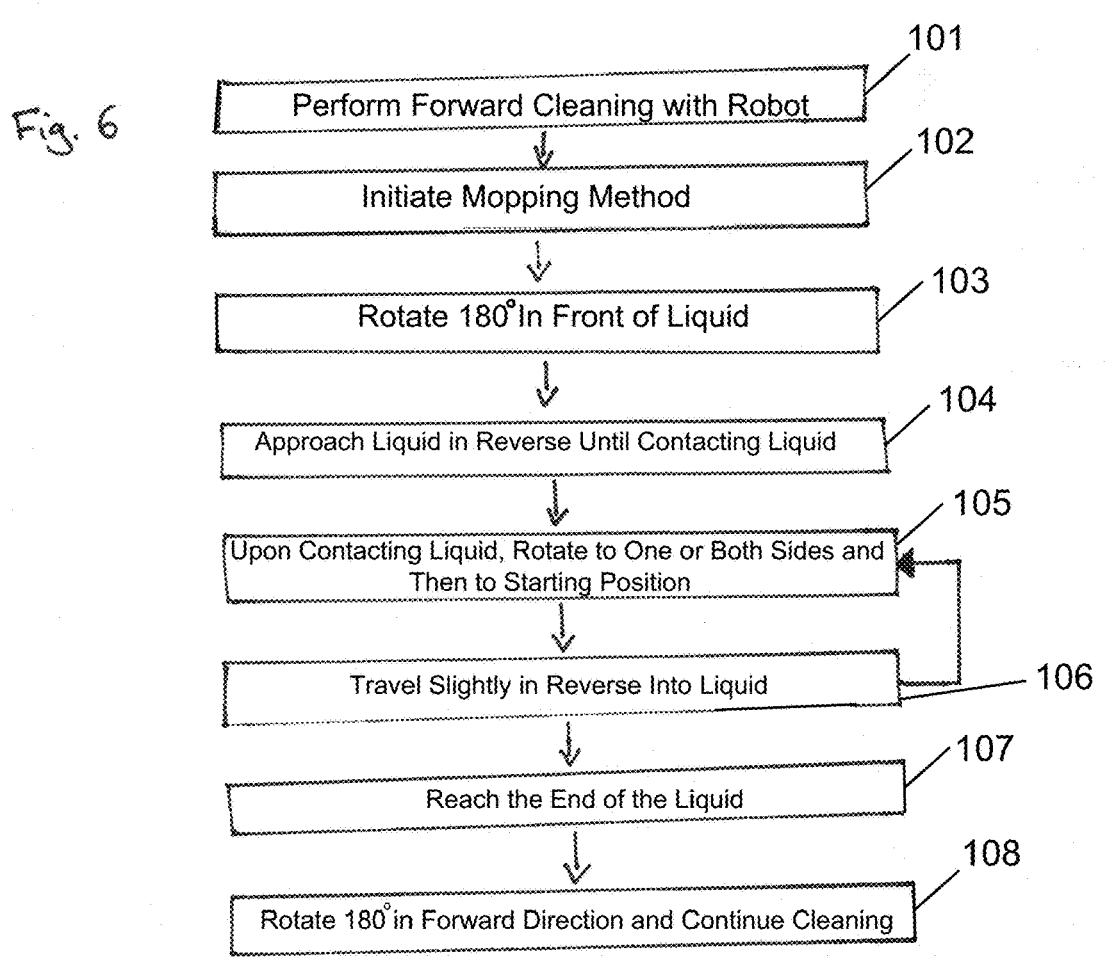
FIG. 6 is a flowchart relating to the control method in accordance with the invention.

FIG. 6 is a flowchart that illustrates the sequence of the driving behavior of the robot in the presence of an accumulation of liquid in its floor processing area. In step 101, the robot performs its cleaning task traveling in a forward direction. If the robot detects an accumulation of liquid on the floor in front of it (step 102), a mopping method is initiated. For this purpose, the robot rotates 180° on the spot in front of the liquid accumulation (step 103). The robot then approaches the accumulation of liquid traveling in reverse until the wet cleaning module, in particular the mopping cloth, has contact with the accumulation of liquid (step 104). Upon contact, the robot rotates to one or both sides about 30° to 90° on the spot and then back to the starting position (position before the rotational movement) (step 105). When the starting position is reached, the robot travels a little in reverse into the liquid accumulation (step 106). Steps 105 and 106 are repeated until the robot reaches the end of the accumulation of liquid (step 107). At the end of the accumulation of liquid, the robot rotates about 180° in the forward direction and continues its cleaning journey traveling in a forward direction (step 108).

The invention claimed is:

1. A method for controlling a mobile, self-propelled appliance, a floor cleaning appliance or at least one of a robot vacuum cleaner or a sweeper and mopping robot, for mopping up an accumulation of liquid, the method comprising:

driving on a floor surface intended for cleaning in a direction of travel in a forward movement of the appliance or robot and cleaning the floor surface by using at least one of a dry cleaning module or a wet cleaning module of the appliance or robot;

detecting the accumulation of liquid in the direction of travel in front of the appliance or robot in a moist area;

terminating the forward movement in front of the moist area and rotating the appliance or robot about substantially 180°;

driving on the moist area in a reversing movement relative to the direction of travel of the appliance or robot and mopping up the accumulation of liquid by using the wet cleaning module;

placing a cleaning liquid supply of the wet cleaning module in an active mode in the forward movement in the direction of travel of the appliance or robot and in an inactive mode in the reversing movement relative to the direction of travel of the appliance or robot;

moistening a mopping unit with cleaning liquid from a container unit in the active mode, stopping the moistening from the container unit during the reversing movement of the appliance or robot while in the inactive mode, and resuming a reactivation of the supply of cleaning liquid to the mopping unit after a predetermined time, depending on a size of the accumulation of liquid.

2. The method according to claim 1, which further comprises performing the reversing movement relative to the direction of travel with rotational movements to one side of 30° to 90° relative to the reversing movement, when the moist area is located to one side of the reversing movement.

3. The method according to claim 2, which further comprises performing the reversing movement by including:

a straight reversing movement of a first short distance toward the moist area;

rotating the appliance or robot on the spot about 30° to 90° to one side or to both sides;

rotating the appliance or robot back to an original starting position prior to rotation; and continuing to travel in a straight reversing movement of a second short distance into the moist area.

4. The method according to claim 3, which further comprises repeatedly rotating, rotating back and continuing to travel, until the moist area has been travelled through.

5. The method according to claim 1, which further comprises performing the reversing movement relative to the direction of travel with rotational movements to both sides about 30° to 90° relative to the reversing movement, when the moist area is located on both sides of the reversing movement.

6. The method according to claim 5, which further comprises performing the reversing movement by including:

a straight reversing movement of a first short distance toward the moist area;

rotating the appliance or robot on the spot about 30° to 90° to one side or to both sides;

rotating the appliance or robot back to an original starting position prior to rotation; and continuing to travel in a straight reversing movement of a second short distance into the moist area.

7. The method according to claim 6, which further comprises repeatedly rotating, rotating back and continuing to travel, until the moist area has been travelled through.

8. The method according to claim 1, which further comprises determining a length of the moist area in the direction of travel upon detecting the accumulation of liquid prior to rotating the appliance or robot.

9. The method according to claim 1, which further comprises checking a presence of the accumulation of liquid after driving on the moist area after predetermined distances by rotating the appliance or robot back in the direction of travel in a forward movement and determining whether the accumulation of liquid continues to be present.

\* \* \* \* \*